US011360226B2

(12) United States Patent
Guigné et al.

(10) Patent No.: US 11,360,226 B2
(45) Date of Patent: Jun. 14, 2022

(54) SYSTEM AND METHOD FOR SPATIALLY IMAGING AND CHARACTERIZING PROPERTIES OF ROCK FORMATIONS USING SPECULAR AND NON-SPECULAR BEAMFORMING

(71) Applicant: Acoustic Zoom, Inc., Paradise (CA)

(72) Inventors: Jacques Y. Guigné, Paradise (CA); Adam Gogacz, St. John's (CA)

(73) Assignee: Acoustic Zoom, Inc., Paradise (CA)

( * ) Notice: Subject to any disclaimer, the term of this patent is extended or adjusted under 35 U.S.C. 154(b) by 427 days.

(21) Appl. No.: 16/290,254

(22) Filed: Mar. 1, 2019

(65) Prior Publication Data
US 2019/0271788 A1 Sep. 5, 2019

Related U.S. Application Data

(60) Provisional application No. 62/636,995, filed on Mar. 1, 2018.

(51) Int. Cl.
G01V 1/30 (2006.01)
G01V 1/28 (2006.01)
(Continued)

(52) U.S. Cl.
CPC .............. *G01V 1/301* (2013.01); *E21B 49/00* (2013.01); *G01V 1/282* (2013.01); *G01V 1/306* (2013.01); *G01V 1/34* (2013.01); *E21B 7/04* (2013.01); *G01V 1/42* (2013.01); *G01V 2210/121* (2013.01); *G01V 2210/1293* (2013.01); *G01V 2210/1295* (2013.01);
(Continued)

(58) Field of Classification Search
USPC .......................................................... 703/10
See application file for complete search history.

(56) References Cited

U.S. PATENT DOCUMENTS

| 8,867,307 | B2 | 10/2014 | Guigne et al. |
| 9,476,997 | B2 | 10/2016 | Pace et al. |
| 9,568,627 | B2 | 2/2017 | Guigne et al. |
| 9,726,711 | B2 | 8/2017 | Schlueter et al. |

(Continued)

OTHER PUBLICATIONS

Australian Examination Report dated Dec. 9, 2019, for Australian Application Serial No. 2019201443.
(Continued)

*Primary Examiner* — Paul D Lee
(74) *Attorney, Agent, or Firm* — Richard A. Fagin

(57) ABSTRACT

A method for imaging non-specular seismic events as well as correlating non-specular events with physically measurable quantites in a volume of Earth's subsurface. Includes entering as input to a computer signals detected by a plurality of seismic sensors disposed above and/or within the volume in response to actuation of at least one seismic energy source above and/or within the volume. Parameter analysis is performed to populate the initial model with point-wise, best-fit wavefront travel-time approximations. Imaging is performed to obtain undifferentiated specular and non-specular representations of the volume. Specular boundaries are mapped using the imaged volume and using the boundaries to form a model of specular components of the volume. Beamforming is used to characterize seismic attributes associated with specular and non-specular reflections as separate and differentiated data sets.

11 Claims, 10 Drawing Sheets

(51) Int. Cl.
*E21B 49/00* (2006.01)
*G01V 1/34* (2006.01)
*E21B 7/04* (2006.01)
*G01V 1/42* (2006.01)

(52) U.S. Cl.
CPC .............. *G01V 2210/1297* (2013.01); *G01V 2210/1299* (2013.01); *G01V 2210/1423* (2013.01); *G01V 2210/1425* (2013.01); *G01V 2210/1427* (2013.01); *G01V 2210/1429* (2013.01); *G01V 2210/161* (2013.01); *G01V 2210/165* (2013.01); *G01V 2210/21* (2013.01); *G01V 2210/51* (2013.01); *G01V 2210/55* (2013.01); *G01V 2210/6169* (2013.01); *G01V 2210/624* (2013.01); *G01V 2210/64* (2013.01); *G01V 2210/643* (2013.01); *G01V 2210/74* (2013.01)

(56) References Cited

U.S. PATENT DOCUMENTS

| 9,726,771 | B1 | 8/2017 | Popovici et al. |
| 9,951,585 | B1* | 4/2018 | Volk .................. E21B 43/003 |
| 2015/0219791 | A1* | 8/2015 | Eccles ................ G01V 99/00 |
| | | | 702/6 |

OTHER PUBLICATIONS

Canadian Office Action dated Mar. 30, 2021, for Canadian Application Serial No. 3,035,192.

Guigné et al., "Acoustic zoom high-resolution seismic beamforming for imaging specular and non-specular energy of jeep oil and gas bearing geological formations", Journal of Natural Gas Science and Engineering, 21 (2014), pp. 568-591.

Canadian Office Action dated Mar. 12, 2020, for Canadian Application Serial No. 3,035,192.

* cited by examiner

SYSTEM AND METHOD FOR SPATIALLY IMAGING AND CHARACTERIZING PROPERTIES OF ROCK FORMATIONS USING SPECULAR AND NON-SPECULAR BEAMFORMING

CROSS REFERENCE TO RELATED APPLICATIONS

Priority is claimed from U.S. Provisional Application No. 62/636,995 filed on Mar. 1, 2018, which application is incorporated by reference in its entirety.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure is related to the field of seismic imaging of subsurface rock formations. More specifically, the disclosure concerns locating spatial position of seismic diffractors in the subsurface from a wellbore, either while the wellbore is being drilled or thereafter.

Wellbore drilling through subsurface rock formations may be performed for the purpose of positioning such wellbores or parts thereof in formations containing useful materials such as hydrocarbons or other minerals. Structures of the subsurface formations, and to some extent the composition of the formations may be determined by reflection seismic surveying techniques known in the art.

As a practical matter, reflection seismic surveying known in the art for determining structural and/or compositional features in the subsurface tend to emphasize features identifiable from specular reflections. It is known in the art that certain features in subsurface formations act as diffractors or scatters of seismic energy. In some cases, geologic properties associated with such diffractors may present drilling hazards or the properties of such diffractors may be economically useful. It is desirable to be able to determine the spatial position of such diffractors.

U.S. Pat. No. 9,476,997 issued to Pace and Guigné discloses a method locating diffractors in the subsurface. Such disclosed method for locating diffractors in subsurface formations includes actuating at least two seismic energy sources at spaced apart locations. Seismic energy is detected in the formations resulting from actuation of the two sources. Signals corresponding to the detected seismic energy are processed to remove components related to direct arrivals from each source. Arrival times of seismic energy in the signals corresponding to energy diffracted from at least one diffractor are identified. The at least one is located diffractor in a plane using the identified arrival times.

There continues to be a need for improved methods for imaging diffractors in subsurface formations using seismic and/or acoustic signals.

SUMMARY

A method for imaging non-specular seismic events in a volume of Earth's subsurface includes entering as input to a computer signals detected by a plurality of seismic sensors disposed above and/or within the volume in response to actuation of at least one seismic energy source above and/or within the volume. In the computer, presence of a specular event in the detected signals is determined and if a specular event is determined, a) in the computer, the determined specular event is used to calculate a normal vector at selected points in the volume, b) in the computer, the normal vectors, the detected signals and a model of seismic velocity are used as input to beamforming to obtain specular and non-specular representations of the volume. If a specular event is not determined, the detected seismic signals are beamformed to generate an image of a non-specular event in the volume. In the computer, correlations of measured seismic properties measured in a wellbore are carried out with the specular and/or non-specular events.

Some embodiments further comprise calibrating the seismic attributes to formation properties using measurements from samples of rock formations obtained from a wellbore and using the calibrated seismic attributes to determine the formation properties at positions in the volume spaced apart from the wellbore.

Some embodiments further comprise determining at least one of structure of, mineral composition of and fluid content of a formation using seismic attributes determined from the non-specular reflections data sets.

In some embodiments, the beamforming comprises implementing, $I(x\_0,x\_1,x\_2) = \Sigma\_((s,r) \in \Omega) \; \psi(s,r,t) \otimes\_0 \; (\Sigma\_(i \in \Gamma(s,r,x\_0,x\_1,x\_2)) \; [[ \; w\_i(s,r,x] \_0,x\_1,x\_2) \; \delta(t + \phi\_i(s,r,x\_0,x\_1,x\_2))]])$ wherein:

$\Gamma(s,r,x\_0,x\_1,x\_2)$ represents the space all ray-paths connecting source location s to image point $I(x\_0,x\_1,x\_2)$ to sensor locations r;

$I(x\_0,x\_1,x\_2)$ represents the output (e.g., scattering intensity, reflectivity, attenuation) at $(x\_0,x\_1,x\_2)$ location, where the output depends on input data type and is not a proxy for a property under assessment;

$\Omega$ represents the collection of all source-sensor pairs;

$\psi(s,r,t)$ represents a trace, that is, signals detected by a sensor at location r, due to source at location s, with t representing that senor's event detection time. A trace may be extended to infinity by padding with zeros before and after the detection time;

$\delta$ represents Dirac distribution (continuous-time signal representation) or Kronecker delta (discrete-time signal representation);

$\otimes\_0$ represents 1-dimensional convolution evaluated at 0 (zero);

$\phi\_i(s,r,x\_0,x\_1,x\_2)$ represents the function which returns travel time from source location s to image point $I(x\_0,x\_1, x\_2)$ to sensor location r along a specific ray-path;

$[ w\_i(s,r,x ]\_0,x\_1,x\_2)$ represents a weight function which embodies, amplitude transmission loss due signal travel from source to image point to receiver, normalization correction due to variable summation count, and specularity or non-specularity condition (pass-reject) based on desired output.

In some embodiments, the determining a specular event comprises reflection seismic image processing.

In some embodiments, the reflection seismic image processing comprises prestack time migration or prestack depth migration.

In some embodiments, inputs to the beamforming comprise the detected signals, spatial distribution of velocity in the volume and a normal vector at each of a plurality of points in the volume.

In some embodiments, the spatial distribution of velocity is determined by reflection seismic imaging velocity analysis.

In some embodiments, the reflection seismic image processing comprises prestack time migration or prestack depth migration.

In some embodiments, the normal vector is determined by best fit curve matching a plurality of points in the volume.

Some embodiments further comprise adjusting the trajectory of a well based on the image of the non-specular event.

DETAILED DESCRIPTION

Figure 1A:
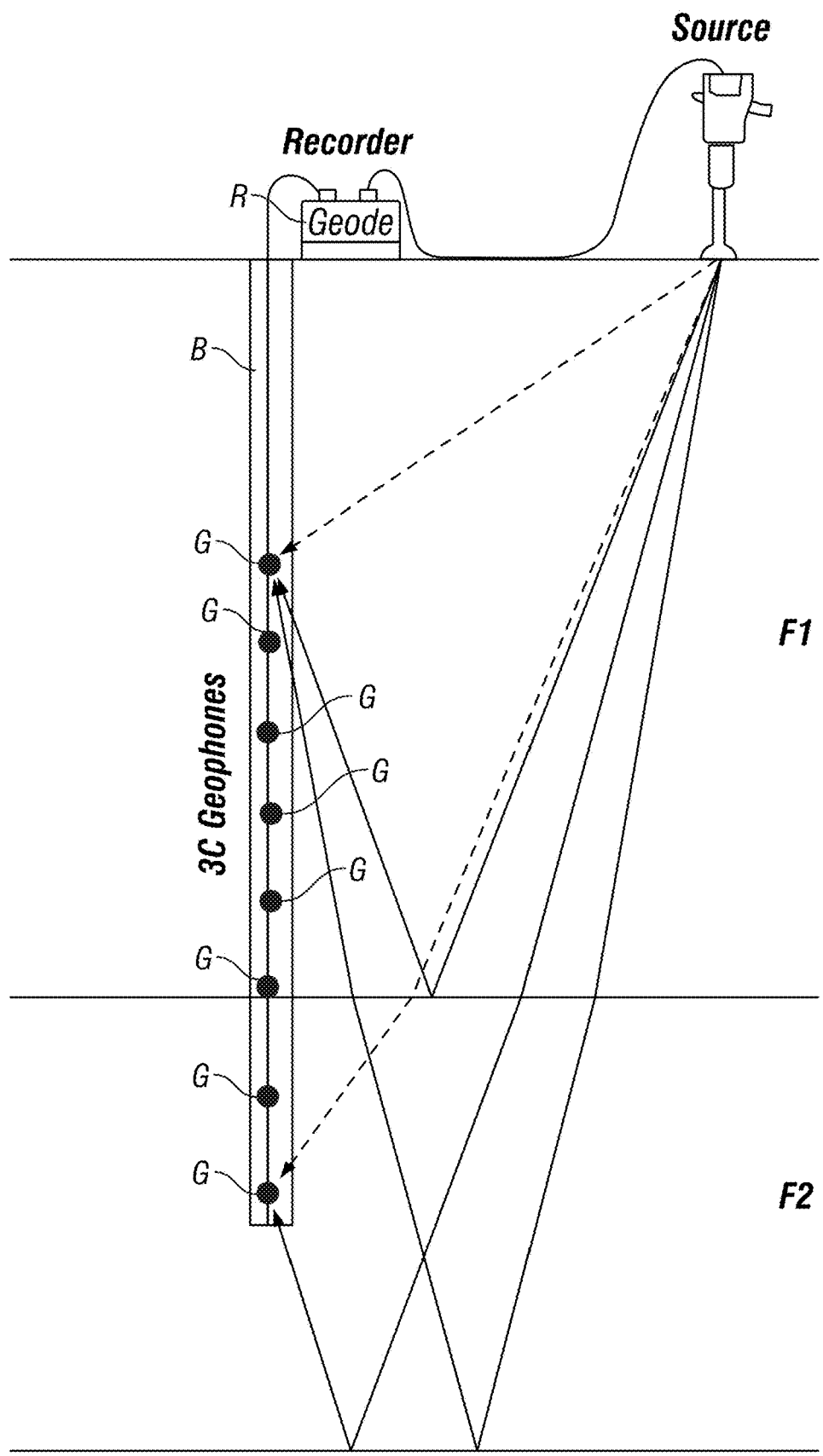
FIG. 1A shows a seismic energy source and receiver array that may be used in some embodiments.

FIG. 1A shows an example signal acquisition apparatus that may be used in some embodiments of methods according to the present disclosure. The apparatus may comprise a seismic energy source SS disposed proximate a wellbore B drilled through rock formations F1, F2. A plurality of seismic sensors G, for example, multicomponent geophones, may be disposed at longitudinally spaced apart locations along the interior of the wellbore B. Signals detected by the seismic sensors G may be communicated to a recording system R, for recording and processing to be further explained below.

Figure 1B:
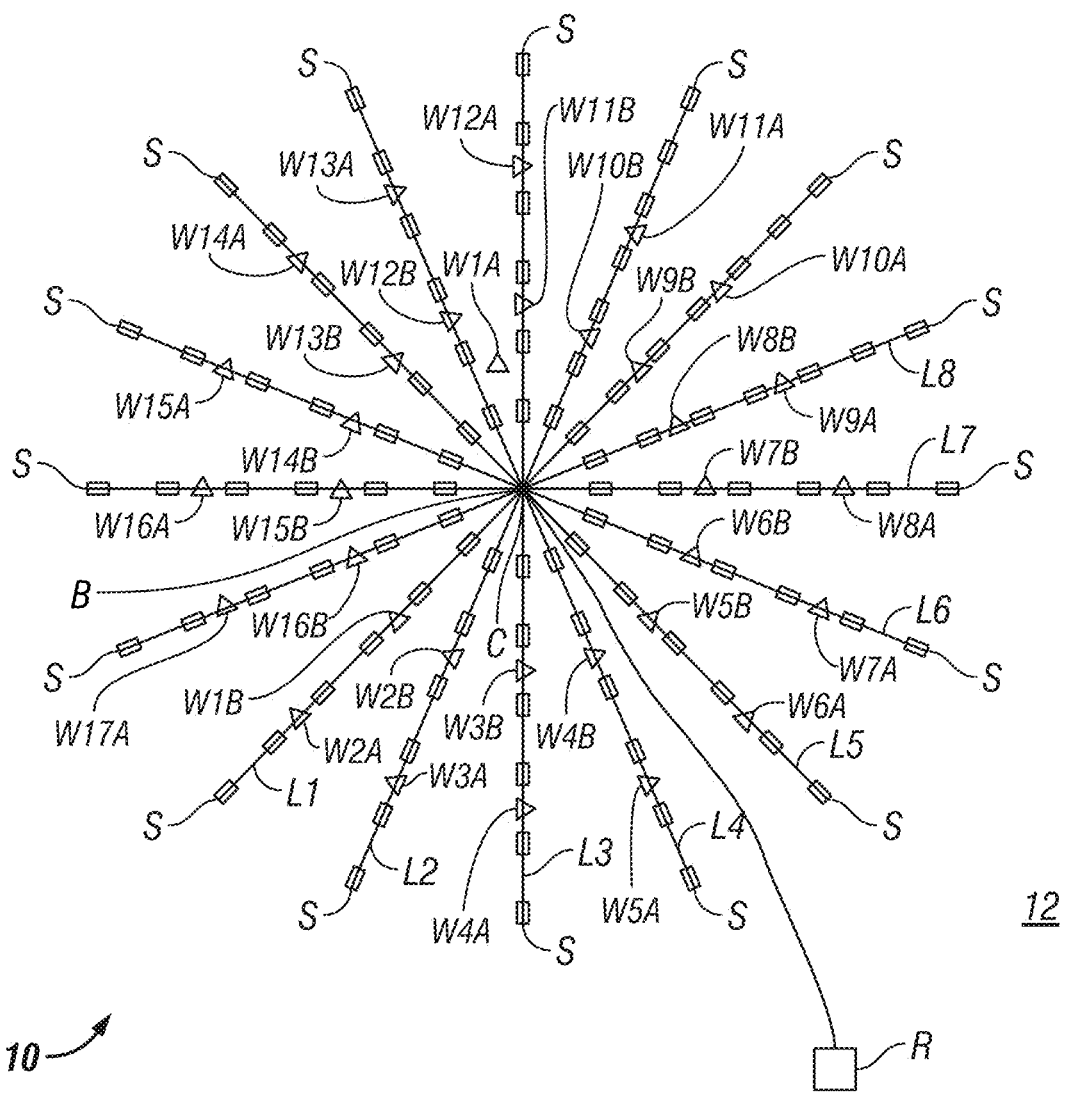
FIG. 1B shows another possible implementation having even greater source focusing capability than the example shown in FIG. 1A.

Some embodiments of a signal acquisition apparatus may comprise a plurality of seismic energy sources and seismic sensors in a selected pattern above a volume of the subsurface to be imaged. An example apparatus as shown in FIG. 1B may include a first seismic energy source disposed at a first selected position, such position being a selected radial distance from the center of the array 10, which center may be coincident with a position of the wellbore B (also as shown in FIG. 1A). The example shown in FIG. 1B has such first positions being along each of a plurality of seismic sensor cables L1-L8. Such seismic energy sources are shown at W2B through W17B, inclusive. A second seismic energy source may be placed at a second selected position being a second radial distance from the center of the array 10. The example of FIG. 1B has these positions being along each of the sensor cables L1-L8. Such second sources are shown correspondingly at W2A through W17A inclusive. A seismic energy source W1A may also be disposed proximate the center of the array 10. The seismic energy sources W1A through W17A and W2B through W17B may be controlled by a seismic energy source controller similar in function to the device described above with reference to FIG. 1A at W6. In the In the example shown in FIG. 1B, the seismic energy sources may in combination form a steerable beam array having an aperture of about two wavelengths of the seismic energy emitted by the sources. The actuation time of the individual sources W1A through W17B may be selected to result in a seismic energy beam directed toward a selected subsurface location. Actuation of the sources with selected delay timing as above may be repeated with different time delays for each individual source to selectively illuminate different positions in the subsurface.

It has been determined through response simulation that using the additional seismic energy sources W2A through W17B as explained above may provide good beam steering response when each first source position is about one wavelength of the seismic energy from the center of the array 10, and each second source position is about two wavelengths from the center of the array 10. The arrangement shown in FIG. 1B includes having the first and second source positions along each sensor cable L1-L8, however, the sources do not need to be so located. The seismic energy sources can be located at any circumferential position with respect to the sensor cables. A recording system as in FIG. 1A may also be provided for the system shown in FIG. 1B to receive and record signals detected by a plurality of seismic sensors in modules shown at S and disposed at spaced apart locations (using the same symbols as those indicated by S) along each seismic sensor cable L1-L8

A longitudinal spacing between seismic sensor modules S on each sensor cable L1-L8, and a number of such seismic sensor modules S on each cable L1-L8 may be determined by the frequency range over which a seismic analysis of the subsurface rock formations is to be performed. Such seismic frequencies, of course, must have been radiated by the seismic energy source. Selection of suitable frequency for the seismic energy source will be explained in more detail below. The longitudinal spacing between seismic sensor modules forming the receiver array is preferably selected such that for a particular seismic frequency the spacing should not be greater than about one-half the seismic energy wavelength. At each frequency an example cable length may be about 50 to 120 wavelengths of the longest wavelength seismic energy frequency. Thus, it is possible to use an array having sensor cables of overall length 120 wavelengths at the lowest frequency, but variable longitudinal spacing along each cable between the seismic sensor modules, so that the overall array will include 120 wavelength-long sensor arrays at higher frequencies with a half-wavelength spacing at such higher frequencies. The sound speed (seismic velocity) used to determine the wavelength is that within the rock formations near the water bottom (or the Earth's surface in land based surveys).

Figure 1C:
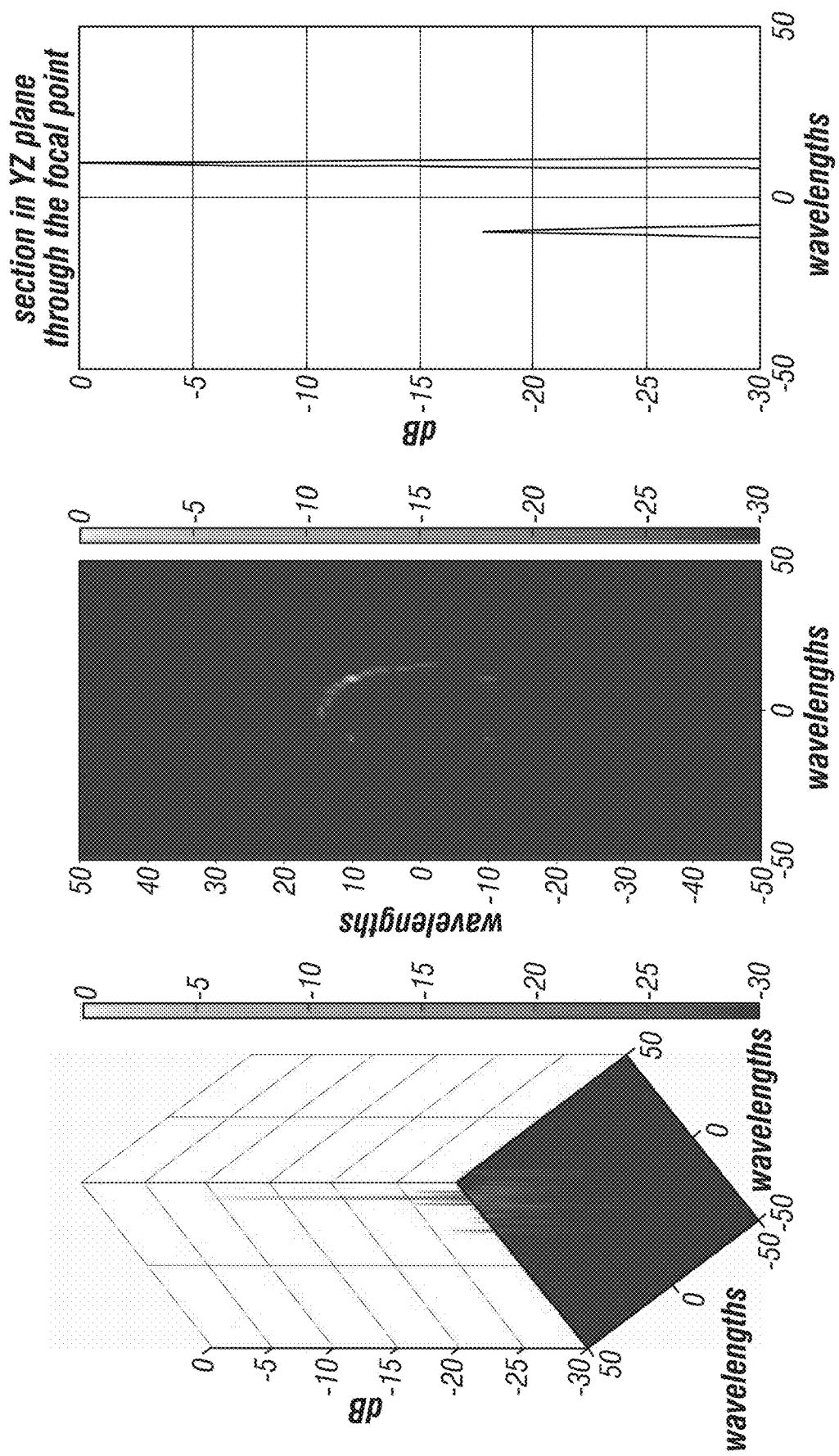
FIG. 1C shows a beam pattern for a possible implementation of a source and sensor array.

A specific implementation may use a programmable seismic energy source that is moved around the site of investigation and a string of sensors placed down in the wellbore (B in FIG. 1A), all the while ensuring that positions of all sensors and sources is noted and stored. A beam pattern as shown in FIG. 1C shows source and sensor array response as beam-steered to diffractors at plurality of locations in the subsurface and as illuminated by a surface source array consisting of, for example and without limitation, 16 lines or "spokes" extending from an array center, each spoke being 40 wavelengths long with sources placed along each of the spokes at half-wavelength intervals, similar in shape to the system shown in FIG. 1B. The source array is focused and steered to a diffractor at each point in a selected volume in the subsurface and the signals from all the diffractors are detected by sensors in a vertical array (80 wavelengths long with sensors spaced apart by half-wavelength intervals), such as shown in FIG. 1A. The output from the vertical array is focused and steered to the same point that the source array is focused and steered to, with its phase center at its midpoint. See, for example, U.S. Pat. No. 8,867,307 issued to Guigné et al. which discloses an example embodiment of beam-steering that may be used in accordance with methods disclosed herein.

Data acquired using an array such as shown in FIG. 1B may support high-resolution imaging of geological structures using a beamforming and beam-steering technique described further below to detect and image discrete and scattered non-specular reflections along with identified specular reflections.

Methods according to the present disclosure for investigation and delineation of mineral deposits, fractures, and/or rock properties rely on maximizing the utilization of high frequency, broad bandwidth sources (e.g., seismic vibrators) to impart forced vibrations with as high a level of output power as is possible while maintaining distortions within predefined thresholds. Time-synchronized sensors (i.e. source and sensor activation times are synchronized to within a predefined error threshold) record and store the sensor signals generated in response to ground motions induced by the source(s).

In shallow marine and land applications (e.g., less than about 500 meters depth from the surface) an embodiment of a seismic energy source may be a high frequency capable vibrator or thumper operated in single impact mode or in a SIST (Swept Impact Seismic Technique) mode. The seismic sensor positions may be set in exact (up to a predefined accuracy) verified locations including in a random pattern, in a spiral, or in a set of radial spoke-like extending patterns as shown in FIG. 1B, and with sensors distributed along the axis of the wellbore, within any selected depths with respect to the wellbore that targets of interest are to be imaged.

The following outlines an example embodiment of a data processing sequence as applied to acoustic or seismic data in the form of real time detected signals or recorded signals, referred to as "primary data" for convenience, collected from a plurality of seismic sensors (resulting from one or more sources) deployed on the surface, inside a wellbore, or permutations of the foregoing. In addition to such data, other data, such as positional data or source(s) and/or sensors(s), wellbore trajectory, or any other ancillary data, is collected and may be co-rendered/augmented with the primary data. An example embodiment of a data processing sequence may comprise:
1. Quality control and rectifying ancillary data;
2. Quality control and rectifying primary data;
3. Co-rendering/combining primary and ancillary data;
4. Quality control and rectifying the combined data (referred to as preprocessed data for convenience) from step 3 above;
5. Suppressing and/or removing spurious events from the combined data, such as noise bursts, guided waves, multiply reflected waves, ground roll, direct arrivals, and any other recorded signals not relevant to imaging;
6. Establishing an image volume in the Earth's subsurface, which may be defined as a 2- or 3-dimensional regular lattice with each lattice node representing a center of a 2- or 3-dimensional lattice cell;
7. If specular reflectors are present in the preprocessed data (i.e., the combined data prior to image processing) then, a. Establishing an initial compressional and/or shear wave velocity model (spatial distribution of compressional and/or shear wave velocity) in the volume; if anisotropic velocity phenomena are observed, then initializing associated anisotropic velocity model(s) in the volume, b. Performing parameter analysis (e.g., velocity analysis) to populate the initial model(s) with best-fit seismic wavefront travel-time approximation values (e.g., using semblance analysis) for each of a plurality of selected points (nodes) in the volume for each seismic sensor position, c. Imaging using conventional seismic migration methods to obtain undifferentiated specular and non-specular representations of the volume (e.g., prestack Kirchhoff time and/or depth migration) using models as explained above, d. Extracting and mapping specular image boundaries (as 2 dimensional surfaces, for example, seismic horizons), and using the mapped specular image boundaries thus determined to form a model of the specular component of the subsurface volume being imaged, e. Using a Guigné-Gogacz Beamformer function as explained below with reference to Eq. (1), imaging and/or deriving attributes associated with specular and non-specular events as separate and differentiated data sets, 8. If no specular events are present in the preprocessed data then, a. Establishing an initial compressional and/or shear wave velocity model; if anisotropic phenomena are observed, then initializing associated velocity model(s), b. Performing parameter analysis (e.g. velocity analysis) via diffraction focusing) to populate initial the model(s) with best-fit seismic wavefront travel-time approximation values (e.g. semblance analysis) for each of a plurality of selected points in the volume to each seismic sensor position, c. Using Guigné-Gogacz Beamformer, as explained below with reference to Eq. (1), obtaining non-specular image representations of the of the subsurface volume being imaged, d. Analyzing the subsurface volume and derived attribute data sets and mine data for relevant information. For example, structure, mineral composition and/or fluid content of formations identified as diffractors may be determined using the foregoing method.

Beamforming in the process described above may be performed according to the following expression, referred to as the "Guigné-Gogacz Beamformer" for convenience:

$$I(x_0,x_1,x_2)=\Sigma_{(s,r)\in\Omega}\psi(s,r,t)\otimes_0(\Sigma_{i\in\Gamma(s,r,x_0,x_1,x_2)}w_i(s,r,x_0,x_1,x_2)\delta(t+\phi_i(s,r,x_0,x_1,x_2))) \quad (1)$$

wherein:

$\Gamma(s,r,x_0,x_1,x_2)$ represents the space all ray-paths connecting source location s to image point $I(x_0,x_1,x_2)$ to sensor locations r;

$I(x_0,x_1,x_2)$ represents the output (e.g., scattering intensity, reflectivity, attenuation) at $(x_0,x_1,x_2)$ location, where the output depends on input data type and is not a proxy for a property under assessment;

$\Omega$ represents the collection of all source-sensor pairs;

$\psi(s,r,t)$ represents a trace, that is, signals detected by a sensor at location r, due to source at location s, with t representing that senor's event detection time. A trace may be extended to infinity by padding with zeros before and after the detection time;

$\delta$ represents Dirac distribution (continuous-time signal representation) or Kronecker delta (discrete-time signal representation);

$\otimes_0$ represents 1-dimensional convolution evaluated at 0 (zero);

$\phi_i(s,r,x_0,x_1,x_2)$ represents the function which returns travel time from source location s to image point $I(x_0,x_1,x_2)$ to sensor location r along a specific ray-path;

$w_i(s,r,x_0,x_1,x_2)$ represents a weight function which embodies, amplitude transmission loss due signal travel from source to image point to receiver, normalization correction due to variable summation count, and specularity or non-specularity condition (pass-reject) based on desired output and subject to equations as in previous slide.

Eq. (1) enables association of selected (specular or non-specular stream) amplitudes of events in seismic energy as detected by the seismic sensors with specific locations in the subsurface. In specular mode, not all the seismic sensors detect signals associated with a specific location in the subsurface; only those sensor-source pairs that satisfy the specularity condition are selected to contribute. For non-specular imaging, the non-specular condition is applied to obtain a corresponding result.

Figure 2:
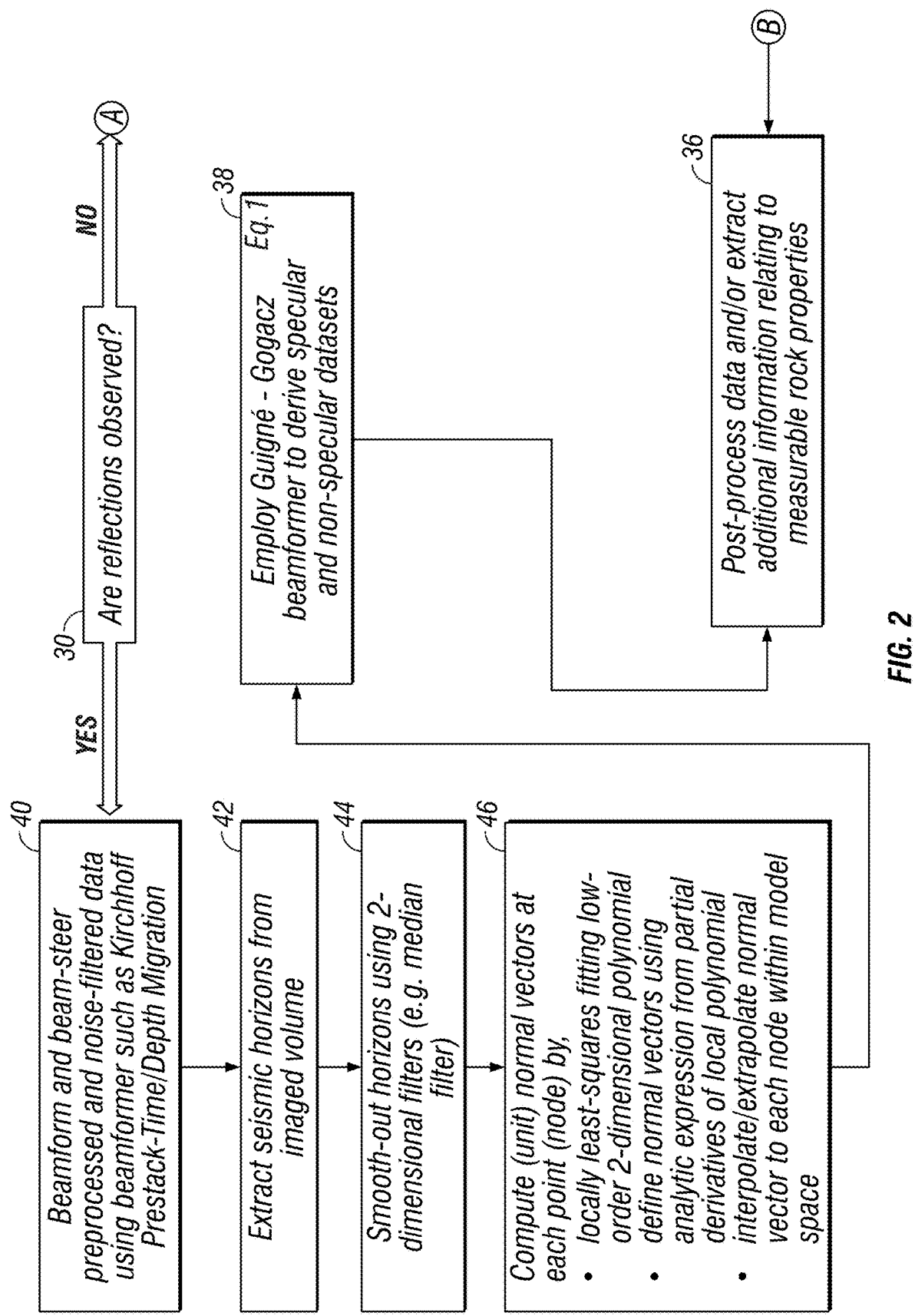
FIG. 2 shows a flow chart of an example method according to the present disclosure.
Figure 2:
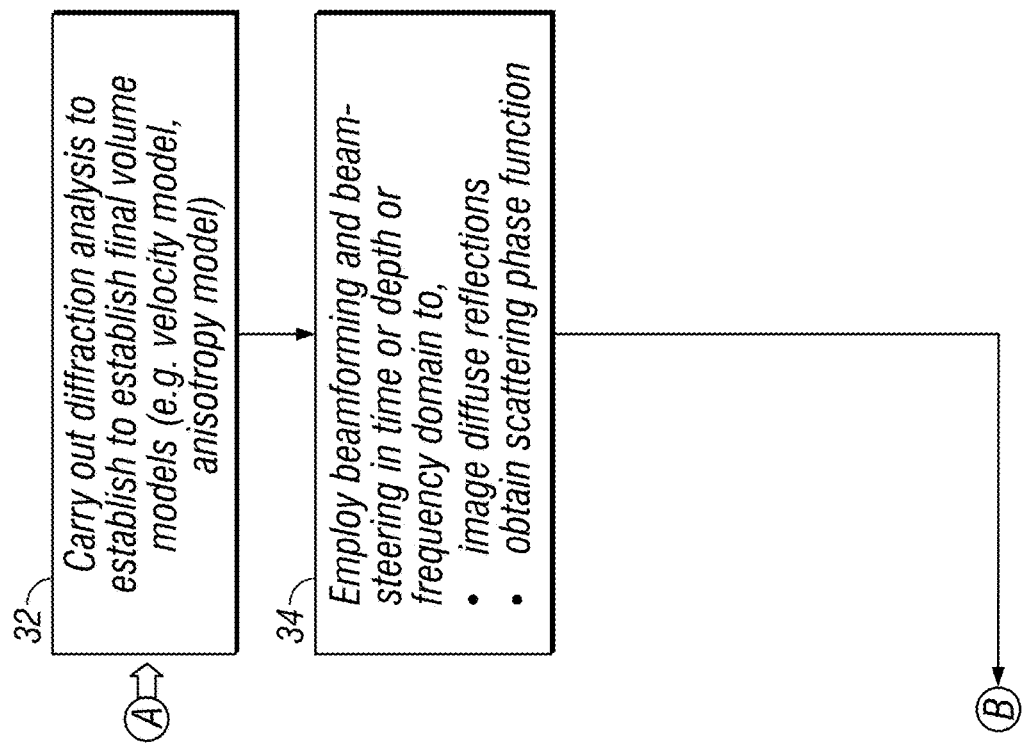

The foregoing example embodiment of a method is shown in a flow chart in FIG. 2. At 30, seismic signals detected by the various seismic sensors, and as may be recorded in the recording unit (R in FIG. 1A and 1B) may be processed using conventional seismic imaging techniques to determine if specular events are present in the detected (and recorded as may be the case) signals. If specular events are present in the detected signals, then at 40, conventional specular reflection seismic imaging such as Kirchhoff prestack time migration and/or depth migration may be used to image such specular events. At 42, the specular events may be extracted from a composite image (containing both specular and non-specular events) generated using the detected seismic signals. The composite image may be generated using, for example, conventional seismic signal processing such as Kirchhoff prestack time migration. At 44, one or more seismic horizons (e.g., continuous specular reflection events) may be smoothed using a 2-dimensional filter such as a median filter. The output of smoothing, if used, is a set of points in space that represent the horizon. At 46, (unit) normal vectors at each point of the horizon (node, defined as explained above as a 2- or 3-dimensional regular lattice with each lattice node representing a center of a 2- or 3-dimensional lattice cell) in the subsurface volume may be computed from, e.g., i) locally least-squares fitting a low-order 2-dimensional polynomial to the determined horizon at each node, ii) defining the normal vectors for the node using an analytic expression from partial derivatives of the local polynomial obtained in the previous step, and iii) interpolating/extrapolating the normal vector to each other node within the subsurface volume. The horizon (a specular 2 dimensional surface for 3 dimensional data or a curve for 2 dimensional data) is represented by a discrete set of points. Fitting of a local polynomial to the surface/curve at each node allows obtaining a local analytic representation of the horizon and thus allows computing normals to the horizon.

Using the sensor signals acquired as explained above, the normal vectors determined as explained above, and a model of spatial distribution of seismic velocity (e.g., as may be determined from imaging at 40, 42),then at 38, the beamforming explained above with reference to Eq. (1) may be used to determine specular-event and non-specular-event (diffractor) seismic data sets. At 36, post processing may be used to determine, from the specular and non-specular data sets, certain properties of the formations (e.g., F1 and F2 in FIG. 1A), for example, amplitude vs. offset (AVO), amplitude vs. angle (AVA) and/or azimuthal variation in amplitude vs. offset (AVAz), or any other amplitude or travel-time dependent methods known in the art, where such processes are performed on the specular events identified in the composite image.

If there are no specular events in the recorded signals, then at 32 in FIG. 2, diffraction-focusing analysis may be performed to establish volume models (e.g., velocity model, anisotropy model), where these models along with preprocessed sensor data comprise inputs to the Guigné-Gogacz Beamformer defined with reference to Eq. (1). At 34, beamforming and beam-steering (explained above) may be performed in the time, depth or frequency domain to, image diffuse reflections and obtain scattering phase functions. At 36, post processing as in the case of specular events may be performed.

In some embodiments, properties of the formations determined as explained with reference to 36 in FIG. 2, may be calibrated using data from physical samples of rock formations penetrated by a wellbore (e.g., F1 and F2 in well B in FIG. 1A). Properties so calibrated may include, for example and without limitation, mineralogy, porosity, compressive strength, elastic modulus and Young's modulus. Calibration may enable determining a correspondence between seismic signal parameters and rock properties. Using the determined correspondence, it may be possible to determine rock properties of the formations at distances of 200 to 300 meters from the well (B in FIG. 1A) using values of seismic parameters as explain above mapped to positions in the subsurface spaced apart from the geodetic trajectory of the well.

Figure 3:
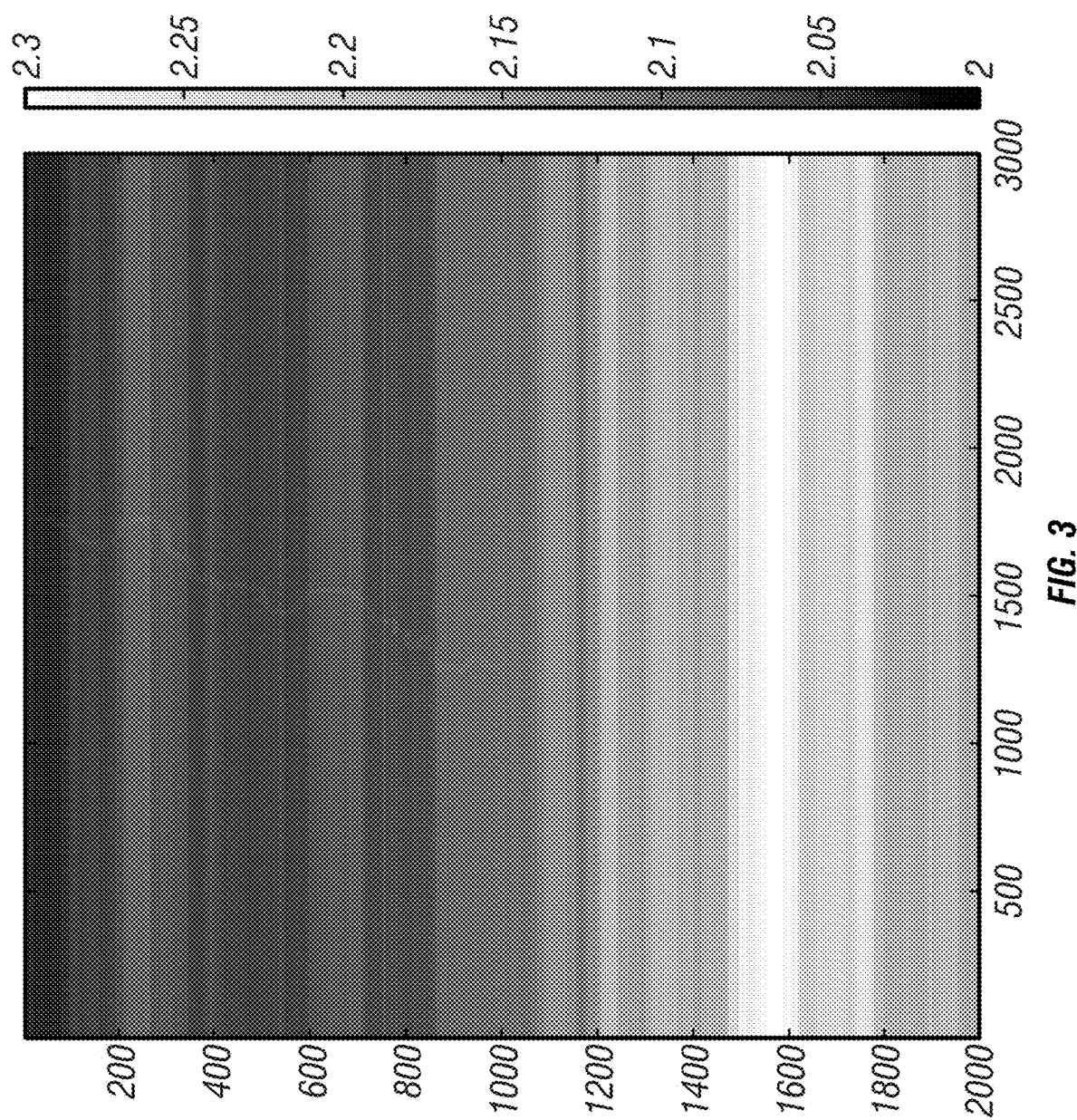
FIG. 3 shows a model of layered subsurface formations having a seismic anomaly having a pseudo random geometry, such as an ore body.
Figure 4:
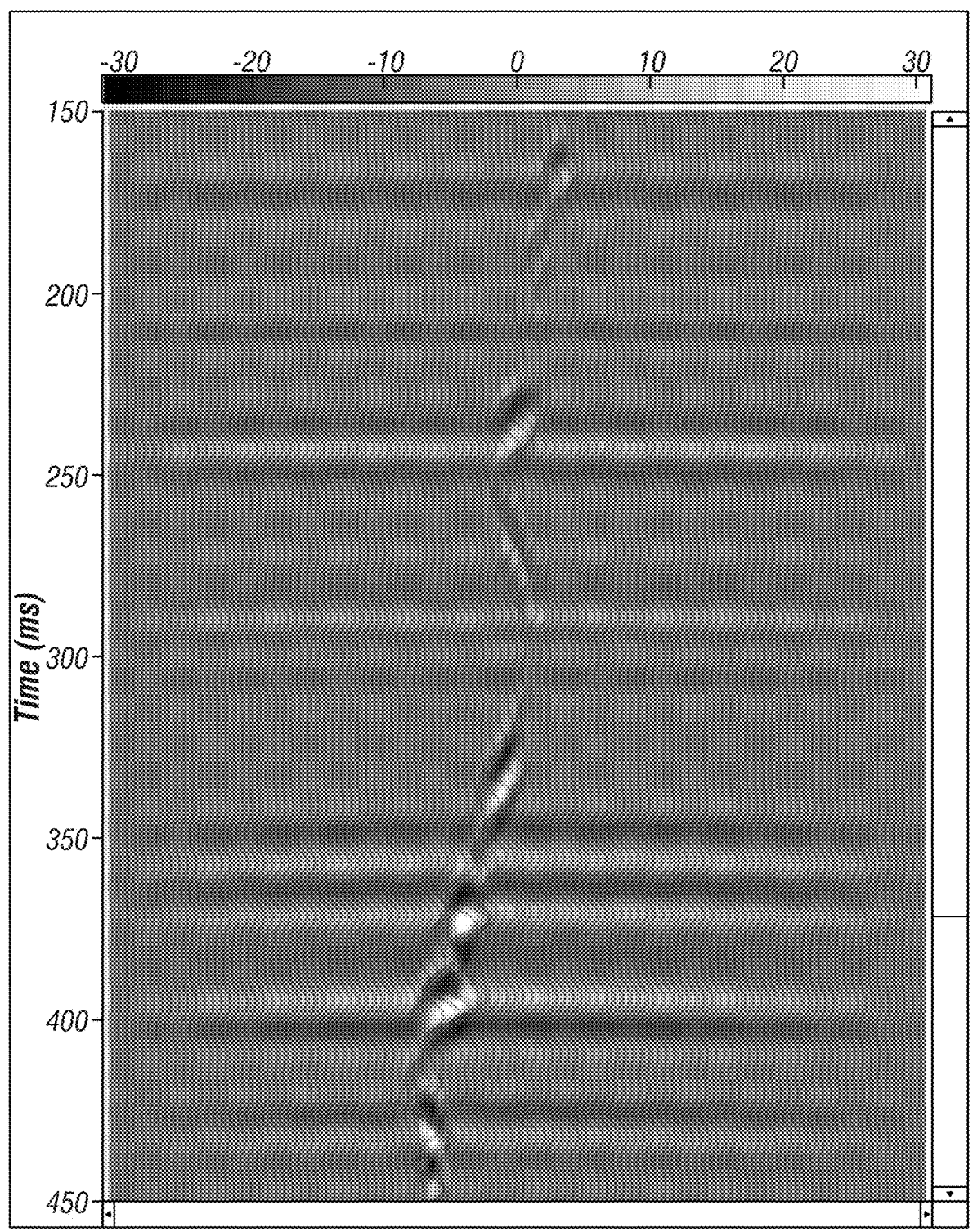
FIG. 4 shows an image of the model of FIG. 3 made using pre-stack time migration known in the art.
Figure 5:
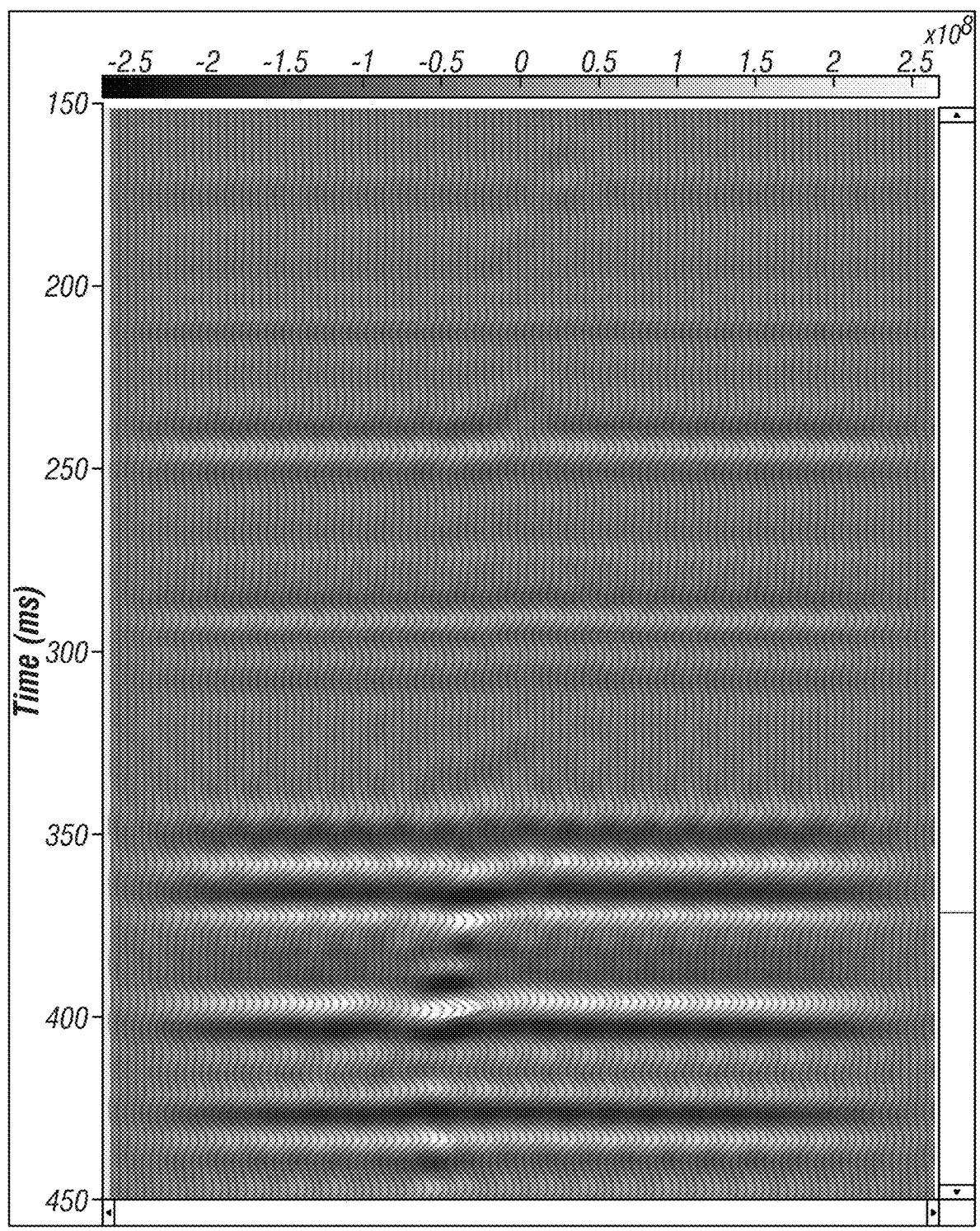
FIG. 5 shows an example of beamforming specular events in the model of FIG. 3.
Figure 6:
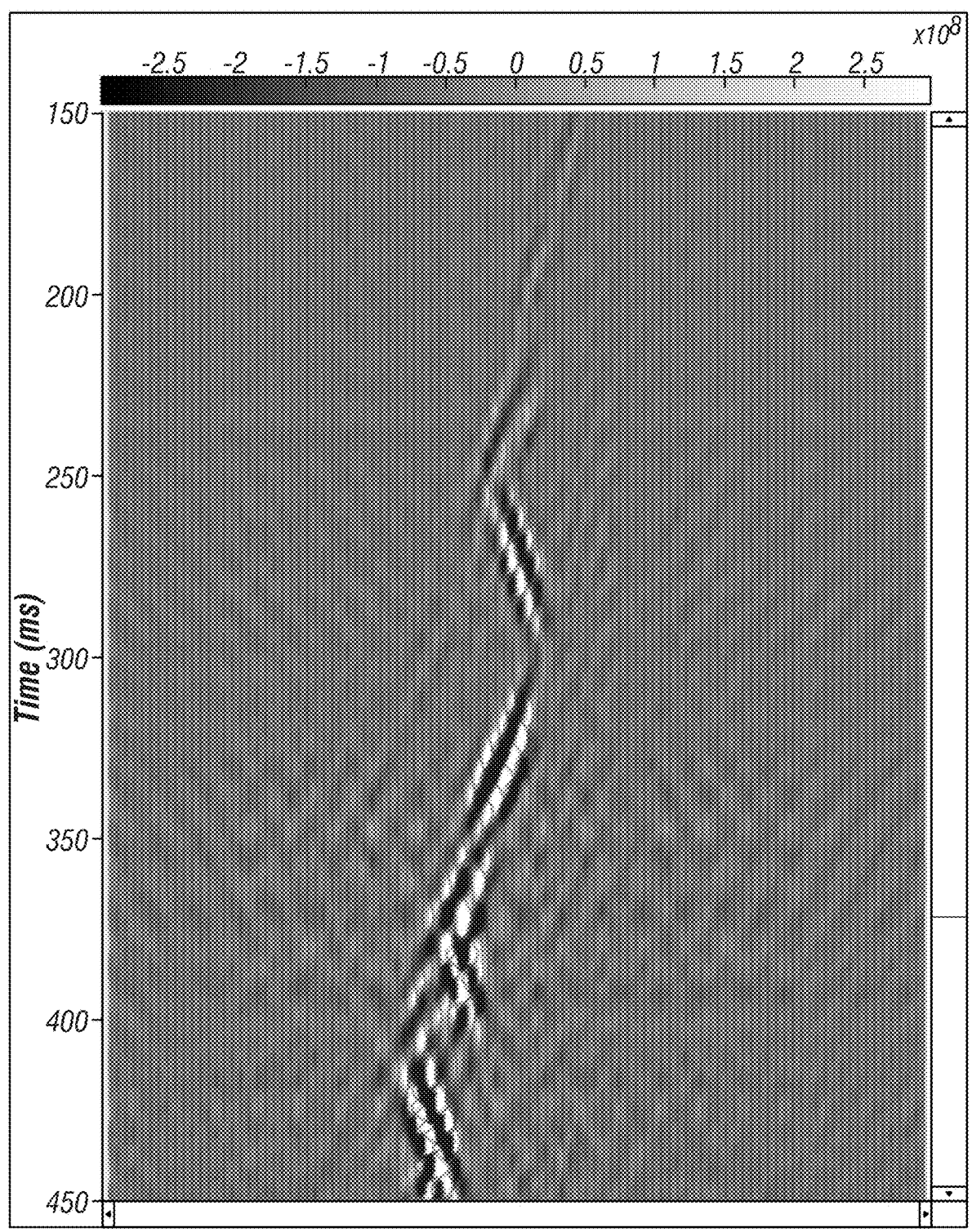
FIG. 6 shows an example image of the seismic anomaly of FIG. 3 using beamforming according to the present disclosure.

An example data set processed using a method according to the present disclosure compared to a data set processed using prior techniques may be observed with reference to FIGS. 3 through 6. FIG. 3 shows a model of layered subsurface formations (selected values of seismic velocity with respect to depth, having a seismic anomaly in a random or pseudo random geometry, such as an ore body. FIG. 4 shows an image of the model of FIG. 3 made using; i) synthetic modeling yielding synthetic data, and ii) pre-stack time migration of synthetic data with migration known in the art. FIG. 5 shows an example of image of the specular component of the model of FIG. 3 made using; i) synthetic modeling yielding synthetic data, and ii) beamforming and beam-steering for specular events in the synthetic data using the beamforming described with reference to Eq.(1) above. FIG. 6 shows an example of image of the non-specular component (embedded ore body) of the model of FIG. 3 made using; i) synthetic modeling yielding synthetic data, and ii) beamforming and beam-steering for non-specular events in the synthetic data using the above described beamformer. In some embodiments, an image of a non-specular seismic event may be used to adjust a trajectory of a well to more effectively intersect or otherwise approach the non-specular seismic event.

Figure 7:
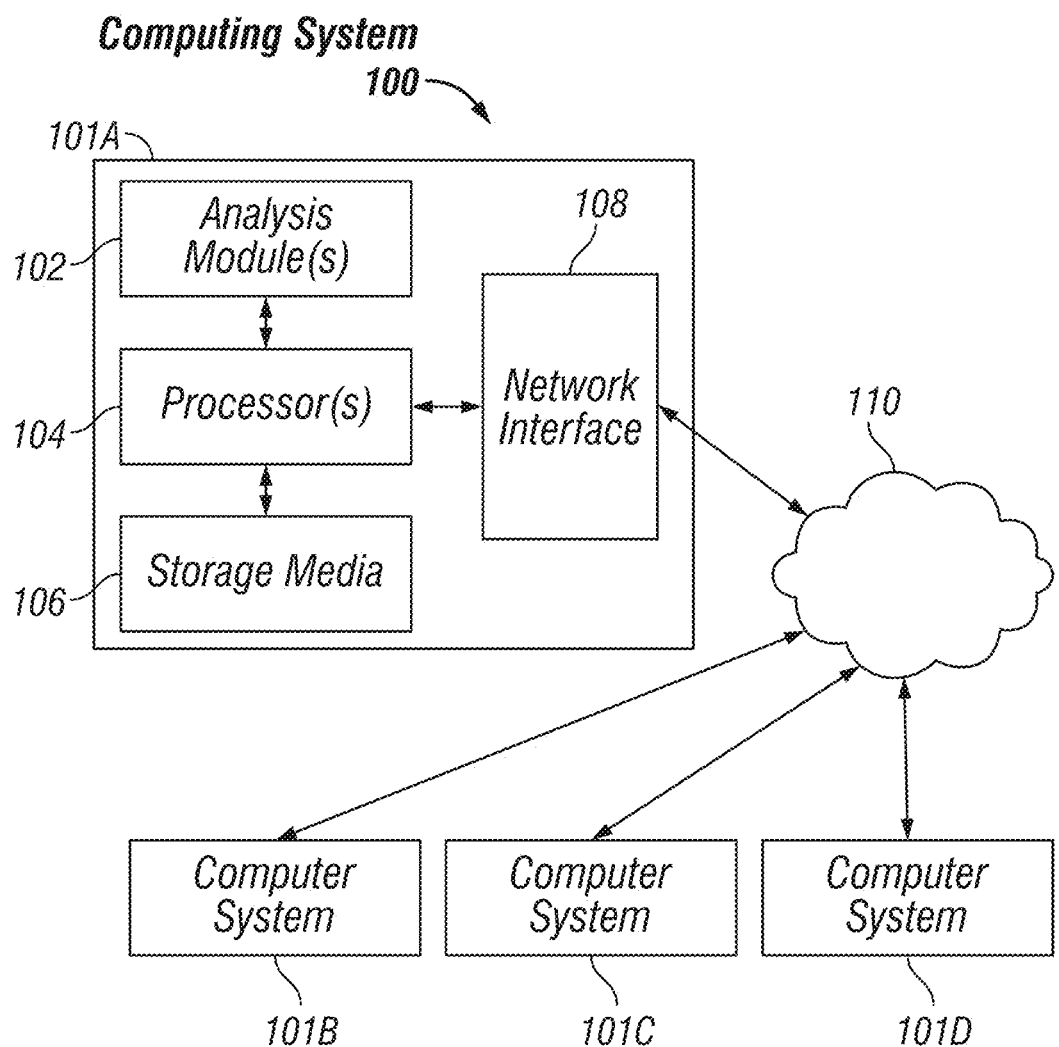
FIG. 7 shows a computer system that may be used in some embodiments.

The foregoing process may be performed on a computer or computer system, an example of which is shown at 100 in FIG. 7. The computing system 100 may be an individual computer system 101A or an arrangement of distributed computer systems. The individual computer system 101A may include one or more analysis modules 102 that may be configured to perform various tasks according to some embodiments, such as the tasks explained with reference to FIGS. 2 through 6. To perform these various tasks, the analysis module 102 may operate independently or in coordination with one or more processors 104, which may be connected to one or more storage media 106. A display device 105 such as a graphic user interface of any known type may be in signal communication with the processor 104 to enable user entry of commands and/or data and to display results of execution of a set of instructions according to the present disclosure.

The processor(s) 104 may also be connected to a network interface 108 to allow the individual computer system 101A to communicate over a data network 110 with one or more additional individual computer systems and/or computing systems, such as 101B, 101C, and/or 101D (note that computer systems 101B, 101C and/or 101D may or may not share the same architecture as computer system 101A, and may be located in different physical locations, for example, computer systems 101A and 101B may be at a well drilling location, while in communication with one or more computer systems such as 101C and/or 101D that may be located in one or more data centers on shore, aboard ships, and/or located in varying countries on different continents).

A processor may include, without limitation, a microprocessor, microcontroller, processor module or subsystem, programmable integrated circuit, programmable gate array, or another control or computing device.

The storage media 106 may be implemented as one or more computer-readable or machine-readable storage media. Note that while in the example embodiment of FIG. 7 the storage media 106 are shown as being disposed within the individual computer system 101A, in some embodiments, the storage media 106 may be distributed within and/or across multiple internal and/or external enclosures of the individual computing system 101A and/or additional computing systems, e.g., 101B, 101C, 101D. Storage media 106 may include, without limitation, one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that computer instructions to cause any individual computer system or a computing system to perform the tasks described above may be provided on one computer-readable or machine-readable storage medium, or may be provided on multiple computer-readable or machine-readable storage media distributed in a multiple component computing system having one or more nodes. Such computer-readable or machine-readable storage medium or media may be considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 100 is only one example of a computing system, and that any other embodiment of a computing system may have more or fewer components than shown, may combine additional components not shown in the example embodiment of FIG. 7, and/or the computing system 100 may have a different configuration or arrangement of the components shown in FIG. 7. The various components shown in FIG. 7 may be implemented in hardware, software, or a combination of both hardware and software, including one or more signal processing and/or application specific integrated circuits.

Further, the acts of the processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of the present disclosure.

Although only a few examples have been described in detail above, those skilled in the art will readily appreciate that many modifications are possible in the examples. Accordingly, all such modifications are intended to be included within the scope of this disclosure as defined in the following claims.

What is claimed is:

1. A method for imaging non-specular seismic events in a volume of Earth's subsurface comprising:

entering as input to a computer signals detected by a plurality of seismic sensors disposed above and within the volume in response to actuation of at least one seismic energy source above and within the volume;

in the computer, determining presence of a specular event in the detected signals and if a specular event is determined;

a) in the computer, using the determined specular event to calculate a normal vector at selected points in the volume;

b) in the computer, using the normal vectors, the detected signals and a model of seismic velocity as input to beamforming to obtain specular and non-specular representations of the volume;

if a specular event is not determined, beamforming the detected seismic signals to generate an image of a non-specular event in the volume and beam steering a response of the detected signals to each of a plurality of image points on the image of the non-specular event;

in the computer, carrying out correlations of measured seismic properties measured in a wellbore with the specular and/or non-specular events; and in the computer, displaying the correlations.

2. The method of claim 1 further comprising calibrating seismic attributes to formation properties using measurements from samples of rock formations obtained from a wellbore and using the calibrated seismic attributes to determine the formation properties at positions in the volume spaced apart from the wellbore.

3. The method of claim 1 further comprising determining at least one of structure of, mineral composition of and fluid content of a formation using seismic attributes determined from the non-specular representation of the volume.

4. The method of claim 1 wherein the beamforming comprises implementing;

$$I(x_0,x_1,x_2) = \Sigma_{(s,r)\in\Omega} \psi(s,r,t) \otimes_0 (\Sigma_{i\in\Gamma(s,r,x_0,x_1,x_2)} w_i(s,r,x_0,x_1,x_2) \delta(t+\phi_i(s,r,x_0,x_1,x_2)))$$

wherein:

$\Gamma(s,r,x_0,x_1,x_2)$ represents all ray-paths in the volume connecting source location s to image point $I(x_0,x_1,x_2)$ to sensor locations r;

$I(x_0,x_1,x_2)$ represents an output (scattering intensity, reflectivity, attenuation) at an image point $(x_0,x_1,x_2)$ in the volume, where the output depends on input data type and is not a proxy for a property under assessment;

$\Omega$ represents a collection of all source-sensor pairs;

$\psi(s,r,t)$ represents a trace, that is, signals detected by a sensor at location r, due to source at location s, with t representing that sensor's event detection time and wherein a trace is extendable to infinity by padding with zeros before and after the detection time;

$\delta$ represents Dirac distribution (continuous-time signal representation) or Kronecker delta (discrete-time signal representation);

$\otimes_0$ represents 1-dimensional convolution evaluated at 0 (zero);

$\phi_t(s,r,x_0,x_1,x_2)$ represents a function which returns travel time from a source location s to the image point $I(x_0,x_1,x_2)$ to a sensor location r along a specific ray-path;

$w_t(s,r,x_0,x_1,x_2)$ represents a weight function which embodies amplitude transmission loss due signal travel from source to image point to receiver, normalization correction due to variable summation count, and specularity or non-specularity condition (pass-reject) based on a desired output.

5. The method of claim 1 wherein the determining a specular event comprises reflection seismic image processing.

6. The method of claim 5 wherein the reflection seismic image processing comprises prestack time migration or prestack depth migration.

7. The method of claim 1 wherein inputs to the beamforming comprise the detected signals, spatial distribution of velocity in the volume and a normal vector at each of a plurality of points in the volume.

8. The method of claim 7 wherein the spatial distribution of velocity is determined by reflection seismic imaging velocity analysis.

9. The method of claim 8 wherein the reflection seismic image processing comprises prestack time migration or prestack depth migration.

10. The method of claim 7 wherein the normal vector is determined by best fit curve matching a plurality of points in the volume.

11. The method of claim 1 further comprising adjusting a trajectory of a well based on the image of the non-specular event.

* * * * *